Jan. 18, 1955　　　S. T. MORELAND ET AL　　　2,699,717
BACON INJECTING MACHINE
Filed April 23, 1952　　　　　　　　　　4 Sheets-Sheet 4
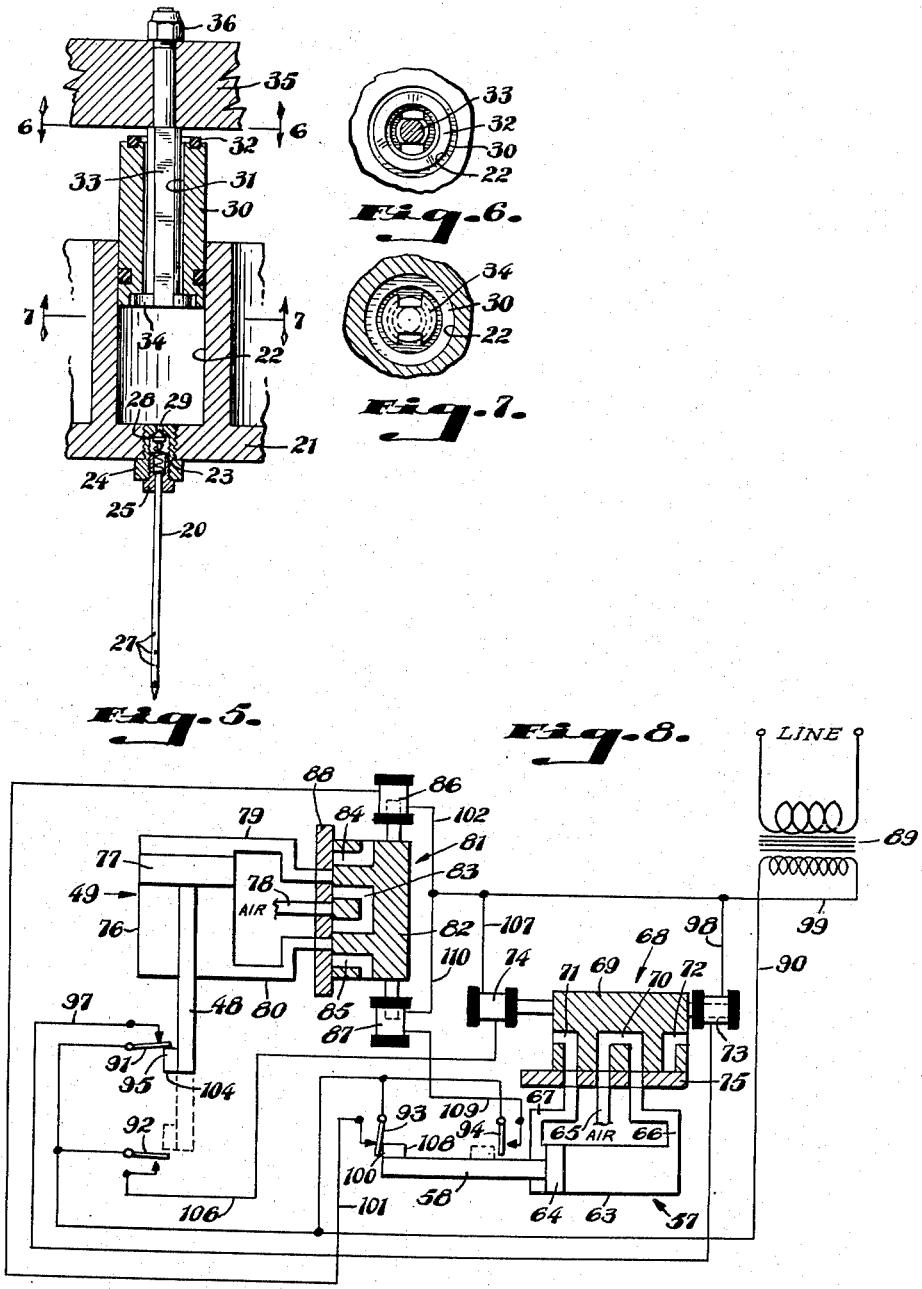
INVENTOR.
STEPHEN T. MORELAND and
WALTER V. HAFFIELD,
BY: Harold B. Hood
ATTORNEY.

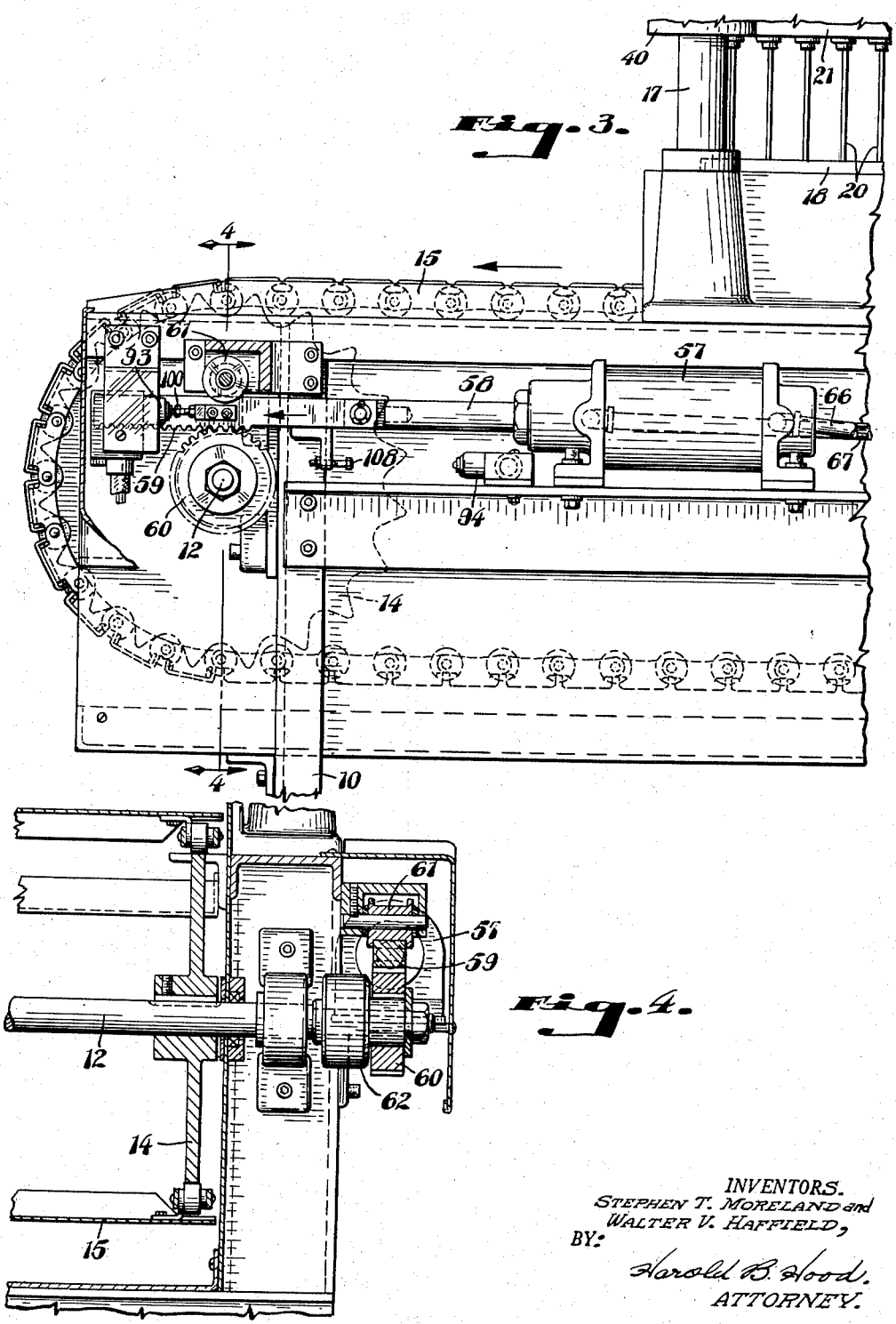

United States Patent Office 2,699,717
Patented Jan. 18, 1955

2,699,717

BACON INJECTING MACHINE

Stephen T. Moreland and Walter V. Haffield, Indianapolis, Ind.; said Haffield assignor to said Moreland Application April 23, 1952, Serial No. 283,928

5 Claims. (Cl. 99—257)

The present invention relates to a machine primarily intended for injecting pickling solution, or any other suitable fluid, into the body of bacon slabs, or any other permeable substance; and the primary object of the invention is to improve and simplify previously known machines for accomplishing a comparable purpose. The machine disclosed herein accomplishes, more simply and less expensively, substantially all of the functions of the machine disclosed in the copending application of Stephen T. Moreland Serial Number 186,183, filed September 22, 1950, for Machine for Injecting Bacon Slabs or the Like; and embodies many of the structural details disclosed in the said copending application. Essentially, the invention disclosed herein constitutes an improvement upon the machine disclosed in the said copending application, through simplification of the automatically controlled actuating mechanism, and through a reduction in the number of moving parts and the introduction of an indexing conveyor for carrying products to be permeated to and from the injecting station. Additionally, in the preferred embodiment of the present invention, pneumatic motors are substituted for the hydraulic motors of the said copending application, whereby further simplification of the actuating system has been effected.

Further objects of the invention will appear as the description proceeds.

To the accomplishment of the above and related objects, our invention may be embodied in the form illustrated in the accompanying drawings, attention being called to the fact, however, that the drawings are illustrative only, and that change may be made in the specific construction illustrated and described, so long as the scope of the appended claims is not violated.

Fig. 3 is a fragmental side elevation, similar to Fig. 1 but drawn to an enlarged scale and with parts broken away for clarity of illustration;

Fig. 4 is a fragmental transverse section taken substantially on the line 4, 4 of Fig. 3;

Fig. 5 is a further enlarged fragmental vertical section through one syringe of the machine;

Fig. 6 is a fragmental horizontal section taken substantially on the line 6, 6 of Fig. 5 and looking in the direction of the arrows;

Fig. 7 is a similar section taken substantially on the line 7, 7 of Fig. 5 and looking in the direction of the arrows; and Fig. 8 is a diagrammatic illustration, showing the electrical and pneumatic controls of the machine.

Figure 1:
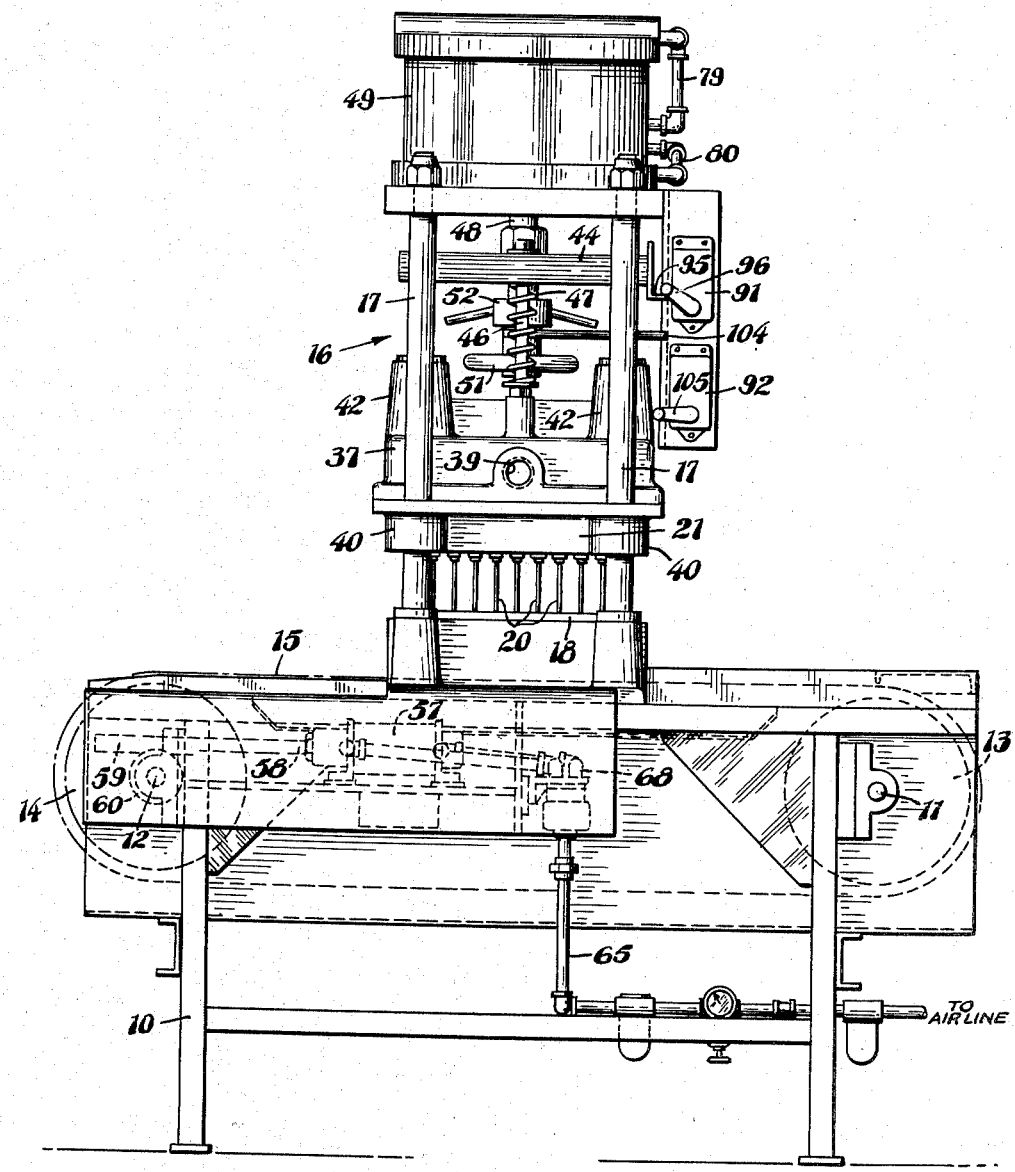
Fig. 1 is a side elevation of a machine constructed in accordance with the present invention.

Referring more particularly to the drawings, it will be seen that we have illustrated a machine comprising a frame 10 in which are journalled parallel axles 11 and 12 upon which are mounted, respectively, sprocket pairs 13 and 14 supporting a continuous, flexible conveyor 15. An auxiliary frame, indicated generally by the reference numeral 16, is mounted upon the main frame 10, substantially midway in the length of the conveyor 15, so that said conveyor travels past the frame 16. The auxiliary frame 16 comprises, essentially, a plurality of upstanding posts 17 upon which is fixedly mounted, near the level of the upper run of the conveyor 15, a stripper plate 18 provided with a multiplicity of perforations 19 (Fig. 2) with which register a similar number of needles 20. Each needle is an element of a syringe assembly carried by a block 21 mounted for reciprocation toward and away from the conveyor 15.

The block 21 is formed with a multiplicity of cylinders 22 (Fig. 5) each of which opens through the upper surface of the block, and each of which is provided, at its lower end, with a threaded bore or port 23 in which is received a bushing 24. The outer end of each bushing 24 is internally threaded for the reception of a cap 25 which carries a needle 20 formed, at its distal end, with a multiplicity of radially-opening perforations 27. A valve 28 is spring-supported in the bore of the bushing 24, and resiliently closes a port 29 providing communication between the interior of the cylinder 22 and the interior of the needle 20, so that fluid may flow, under pressure, from the interior of the cylinder 22 through the needle 20 to emanate from the perforations 27; but reverse fluid flow is positively prevented.

In each cylinder 22 is reciprocably mounted a piston 30 formed with an axial bore 31 therethrough, the outer end of said bore being guarded by an annular gasket 32. A mutilated stem 33 is reciprocably supported in the piston bore 31, and carries a mutilated cap 34 at its inner end. The outer end of each stem penetrates a head 35 and is fixed relative to said head by suitable means such, for instance, as a nut 36 threaded on the stem and turned down against the upper surface of the head 35.

It will be clear that, as the head 35 is moved upwardly, it will lift the stems 33 of all of the syringes until the cap 34 of each stem engages its piston; and thereafter further upward movement of the head 35 will draw the pistons 30 upwardly with respect to their cylinders 22. The outer end of each bore 31 being open (by reason of the spacing between the head 35 and the gasket 32) fluid will be drawn, through said bore 31, into the cylinder 22. Now, as the head 35 starts to move down from, for instance, the position of Fig. 5, each piston will be retarded by a dashpot effect, so that the head 35 will move into sealing engagement with the gasket 32. Further downward movement of the head 35 will drive the pistons downwardly, thereby forcing fluid through the ports 29 and the needles 20 to be ejected through the perforations 27.

A shell or cover 37 (Fig. 2) is suitably secured to the upper surface of the block 21 and cooperates therewith to define a reservoir 38 in which the head 35 is located and with which the outer ends of the piston bores 31 communicate, whenever the head 35 is spaced from the gaskets 32. The cover 37 will be provided with one or more ports 39 through which the reservoir may be charged with fluid to be injected by the syringes.

The block 21 is provided with bosses 40 slidably guided upon the several posts 17.

A plurality of plungers 41 will be suitably secured to the head 35, and each plunger is reciprocably guided in, and penetrates, a boss 42 formed on the cover 37, said plungers emerging to the outside of the reservoir assembly. A reduced portion 43 at the upper end of each plunger penetrates a plate or spider 44, and nuts 45 are threadedly received on said reduced plunger ends to secure the plate 44 immovably to the several plungers.

A plurality of guide rods 46 have their lower ends secured to the cover 37; and the upper ends of said guide rods loosely penetrate the plate 44, a coiled spring 47 being sleeved on each guide rod and being confined between the plate 44 and the outer surface of the cover 37, said springs acting resiliently to hold the plate 44 at a maximum distance above the cover 37, and thereby to hold the head 35 in its uppermost location within the reservoir 38.

The stem 48 of the reciprocating element of a fluid motor 49, supported upon a platform 49' at the upper ends of the posts 17, is suitably fixed to the plate 44 and, in the illustrated embodiment of the invention, said stem penetrates the plate and projects therebelow. As illustrated, the stem and plate are held in relatively fixed positions by means of one or more nuts 50 threaded on the stem 48 and abutting the plate 44. At its lower end, the stem 48 threadedly receives a hand wheel element 51 which, by rotation relative to the stem, can be adjusted toward and away from an abutment surface 26 carried on the cover 37; and a jam nut 52 is likewise threaded on the stem 48 to lock the wheel 51 in any selected position of adjustment relative to said stem.

Now, it will be seen that, as the motor 49 is energized to force the stem 48 downwardly, the plate 44 will move downwardly, carrying the head 35 therewith, through the medium of the plungers 41. The springs 47 will cause the reservoir to move synchronously with the head 35, whereby the needles 20 will be shifted toward the conveyor 15. If a slab of bacon 103, or similar product, is concurrently in registry with the bank or gang of syringes, the needles 20 will enter the slab; and the parts are so proportioned and designed that the extremities of the needles will be stopped, by engagement of the bosses 40 with abutment shims 40', when the tips of the needles are just short of the surface of the conveyor 15. Now, as the stem 48 continues to move downwardly, the springs 47 will be compressed and the head 35 will move downwardly with respect to the block 21, carrying the pistons 30 therewith, to express fluid from the cylinders 22 through the needles 20 and into the body of the slab 103.

The extent of downward movement of the pistons 30 within their cylinders 22 may be adjustably limited by adjustment of the hand wheel 51, since such movement will be stopped when said hand wheel abuts the surface 26.

Figure 2:
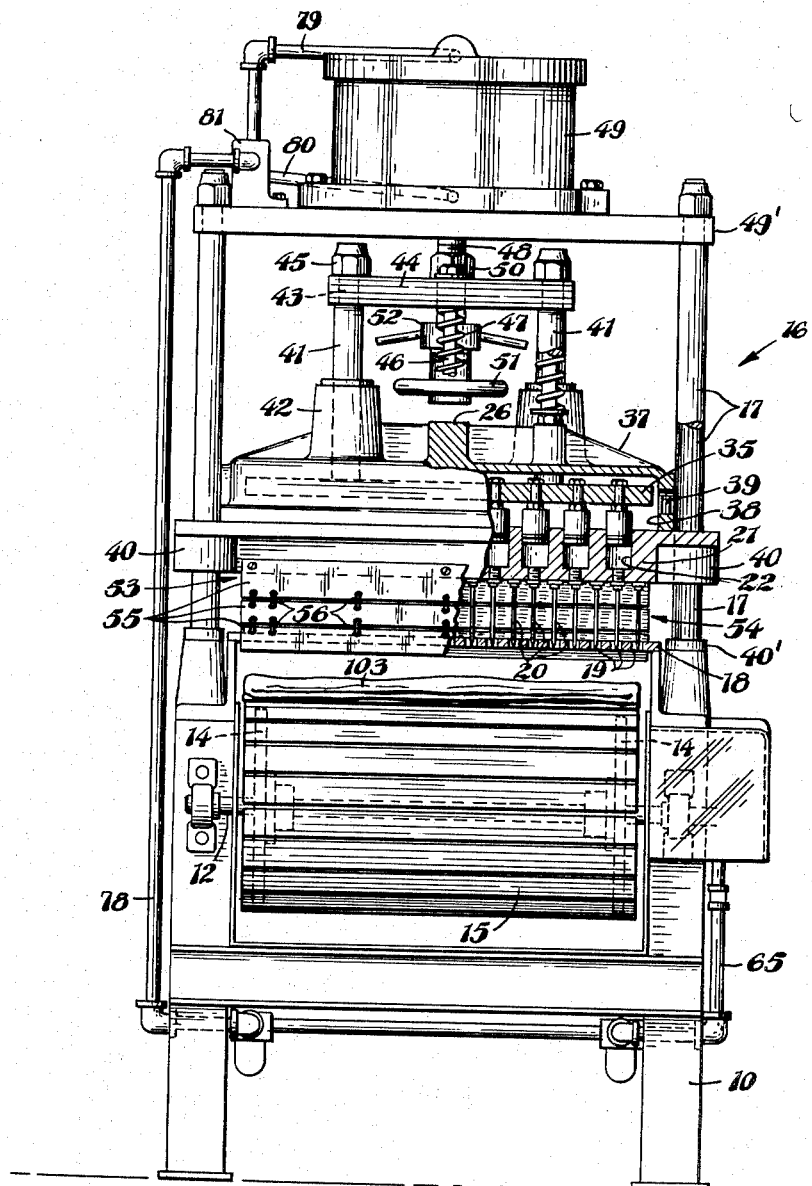
Fig. 2 is an end elevation thereof, taken from the left-hand end of Fig. 1.

As the stem 48 is moved upwardly, of course, the springs 47 will act, first, to lift the head 35 relative to the block 21, thus drawing fluid from within the reservoir 38 into each of the cylinders 22; and, when the head 35 reaches its illustrated position within the reservoir, further upward movement of the stem 48 will lift the block 21 and the entire reservoir, to return the same to the positions illustrated in Fig. 2.

Since the slabs 103 are not necessarily of uniform size, so that, in some instances, some of the needles 20 may be located outside the perimetral boundaries of a slab, it is desirable to provide splash guard means. In the present instance, we supported curtains 53 and 54 at the opposite sides of the block 21, each curtain preferably comprising a series of laterally elongated slats 55 hingedly joined in depending succession, by suitable hinge means such as the rings 56.

We prefer to drive the conveyor 15 step by step, each movement of the conveyor bringing a fresh slab 103 of material to be impregnated, into registry with the gang of syringes. We have illustrated a preferred driving means for the conveyor primarily in Figs. 3 and 4. A pneumatic motor 57 having a reciprocating stem 58 is mounted on a suitable portion of the frame 10 adjacent the shaft 12, and the stem 58 carries a rack 59 at its distal end. Said rack meshes with a pinion 60 loosely journalled on the shaft 12, but drivingly connected to one-way clutch 62 mounted on said shaft; the arrangement being such that, as the rack moves toward the left as viewed in Fig. 3, the pinion 60 will act through the clutch 62 to rotate the shaft 12; while the pinion will rotate in the opposite direction, upon movement of the rack to the right, without affecting the shaft. An idler roller 61 engages the upper surface of the rack 59 to hold the same positively in mesh with the pinion 60.

As is indicated in Fig. 8, the motor 57 comprises a cylinder 63 in which is reciprocably mounted a piston 64 carrying the stem 58. A pipe 65 leads from a source (not shown) of air under pressure; while pipes 66 and 67 lead respectively to the opposite ends of the cylinder 63. A control valve is indicated generally by the reference numeral 68, and may include a slide member 69 formed with a supply passage 70 and exhaust passages 71 and 72. Solenoids 73 and 74 are operatively connected to the slide member 69 to shift the same in opposite directions with respect to a ported plate 75 with which the pipes 65, 66 and 67 are associated. When the slide member 69 is in its illustrated position, communication is established, through the passage 70, between the pipe 65 and the pipe 66 to supply air under pressure to the right-hand end of the cylinder 63 to advance the piston 64 and stem 58, while the passage 71 communicates with the pipe 67 to exhaust the left-hand end of the cylinder 63. When the solenoid 74 is energized, the slide member 69 will be shifted to the opposite end of its path, wherein the passage 70 will establish communication between the pipes 65 and 67 while the passage 72 will communicate with the pipe 66 to exhaust the right-hand end of the cylinder, whereby the piston 64 will be moved to the right to retract the stem 58.

Similarly, the motor 49 comprises a cylinder 76 in which is reciprocably mounted a piston 77 operatively connected to the stem 48. A pipe 78 leads from the source of air under pressure, while pipes 79 and 80 communicate, respectively, with the opposite ends of the cylinder 76, said pipes extending to a ported valve plate 88 upon which the slide member 82 moves. A valve 81 comprises a slide member 82 provided with a supply passage 83 and exhaust passages 84 and 85; and solenoids 86 and 87 are operatively connected to shift the slide member 82. When the solenoid 86 is energized, the slide member 82 will be moved to the upper end of its path, in which position the passage 83 will establish communication between the pipes 78 and 79, while the passage 85 will register with the pipe 80 to exhaust the lower end of the cylinder 76, whereby the piston 77 will be moved downwardly to project the stem 48. When the solenoid 87 is energized, the slide member 82 will be moved to the lower end of its stroke, thereby causing the passage 83 to establish communication between the pipes 78 and 80 and bringing the passage 84 into registry with the pipe 79 to exhaust the upper end of the cylinder 76, so that the piston 77 will be moved upwardly to retract the stem 48.

A source of electric energy for energizing the solenoids 73, 74, 86 and 87 is indicated by the transformer 89. A line 90 leads from one end of the secondary coil of said transformer to one side of each of a plurality of normally open switches 91, 92, 93 and 94. A finger 95 (Fig. 1) mounted to move with the plate 44, engages a lever 96 to hold the switch 91 closed whenever the stem 48 is fully retracted. When the switch 91 is closed, an energizing circuit for the solenoid 73 is established through wire 90, switch 91, wire 97, solenoid 73, wire 98 and wire 99 to the other side of the transformer. Energization of the solenoid 73 will shift the slide member 69 of valve 68 to its illustrated position, whereby air under pressure will be supplied to the right-hand end of cylinder 63 and the left hand end of the cylinder will be exhausted. Thereby, the piston 64 will be moved to the left, the rack 59 will drive the pinion 60 in a counter-clockwise direction, the clutch 62 will be actuated to drive the shaft 12 correspondingly, and the conveyor 15 will thereby be indexed forwardly to carry a fresh slab of material into registry with the gang of syringes. As the piston 64 reaches the left-hand end of its stroke, an abutment element 100 (Figs. 3 and 8) will strike the actuating button of the switch 93 to close said switch 93, thereby establishing an energizing circuit for the solenoid 86, from one side of the transformer through wire 90, switch 93, wire 101, solenoid 86, wire 102, and wire 99 to the opposite side of the transformer. Thereby, the slide element 82 of the valve 81 will be lifted to supply fluid under pressure to the upper end of the cylinder 76 and to exhaust the lower end of said cylinder. As the piston 77 starts downwardly, the finger 95 releases the lever 96 and the switch 91 will open. As the stem 48 is driven downwardly, the gang of syringes will be moved and the pistons 30 will be operated, in the manner above described, to force fluid from the reservoir 38 into the body of the slab 103. As the stem 48 nears the lower end of its stroke, a finger 104 adjustably supported thereon between the hand wheel 51 and the jam nut 52, engages a lever 105 and shifts the same to close the switch 92, thereby establishing an energizing circuit for the solenoid 74 from one side of the transformer through wire 90, switch 92, wire 106, solenoid 74, wire 107 and wire 99 to the opposite end of the transformer. Upon energization, the solenoid 74 will shift the slide member 69 of the valve 68 to its left-hand position to supply air under pressure to the left-hand end of the cylinder 63 and to exhaust the right-hand end of said cylinder. Note that the valve 68 is not actuated until after the completion of the expressing action of the pistons 30, so that the pistons remain in their lowermost positions during retraction of the stem 58. Thus, the syringes are allowed to dwell for a period after expression of the fluid through the syringes, to permit flow of the impregnating fluid through the body of the slab 103, before the pistons 30 begin to retract. The time extent of this dwell can, of course, be controlled by the rate of flow of air to the left-hand end of the cylinder 63; and, if desired, a manually manipulable valve may be introduced into the pipe 67 or into the pipe 66 to adjust the rate of movement of the piston 64.

Upon completion of the retractile movement of the stem 58, an abutment element 106 carried thereby will engage the actuating button of the switch 94 to close said switch, thereby establishing an energizing circuit for the solenoid 87 from one side of the transformer through wire 90, switch 94, wire 109, solenoid 87, wire 110 and wire 99 to the other side of the transformer. Thereby, slide member 82 of valve 81 will be shifted to its lowermost position to supply air under pressure to the lower end of the cylinder 76 and to exhaust the upper end of said cylinder, whereby the piston 77 will be moved upwardly to retract the stem 48. As the stem 48 is retracted, the cylinders 22 will be refilled with fluid from the reservoir 38, the needles 20 will be withdrawn from the slab 103, and then the gang of syringes will be lifted to the position illustrated in Fig. 2, all as described above. When the stem 48 reaches its uppermost position, the finger 95 will shift the lever 96 to close the switch 91, and the machine will move automatically through another cycle as above described.

We claim as our invention:

1. In a machine of the class described, a gang of syringes, each comprising a chamber, a piston reciprocable in said chamber, and a perforated needle communicating with said chamber, a travelling conveyor arranged to move past said gange of syringes, first power means for indexing said conveyor, step-by-step, past said gang of syringes, a second power means for reciprocating said gang of syringes toward and away from said conveyor to cause said needles to enter a product supported on said conveyor, said second power means acting, after such entry, to advance said pistons simultaneously to force fluid from said chambers and through said needles to permeate such product, and control means for said power means comprising an element shifted by said first power means at the end of a conveyor-indexing actuation thereof to activate said second power means to advance said gang of syringes and said pistons, an element shifted by said second power means at the end of a piston-advancing actuation to activate said first power means to effect retraction thereof, an element shifted by said first power means at the end of its retraction to activate said second power means to retract said pistons and said gang of syringes, and an element shifted by said second power means at the end of retraction of said gang of syringes to activate said first power means to index said conveyor.

2. In a machine of the class described, a gang of syringes, each comprising a chamber, a piston reciprocable in said chamber, and a perforated needle communicating with said chamber, a travelling conveyor arranged to move past said gang of syringes, a first fluid motor, a rack connected for reciprocation by said motor, means including a one-way clutch connecting said rack to drive said conveyor step-by-step past said gang of syringes, valve means for controlling fluid flow to and from said motor, electrically-activated means for shifting said valve means including a first circuit effective, when energized, to shift said valve means to advance said rack, a first normally-open switch connected in said first circuit, a second circuit effective, when energized, to shift said valve means to retract said rack, a second normally-open switch connected in said second circuit, a second fluid motor connected to reciprocate said gang of syringes toward and away from said conveyor to cause said needles to enter a product supported on said conveyor and, after such entry, to advance said pistons simultaneously to force fluid from said chambers and through said needles to permeate such product, a second valve means for controlling fluid flow to and from said second motor, and electrically-activated means for shifting said second valve means including a third circuit effective, when energized, to shift said second valve means to advance said gang of syringes and said pistons, a third normally-open switch in said third circuit, a fourth circuit effective, when energized, to retract said pistons and said gang of syringes, a fourth normally-open switch in said fourth circuit, means driven by said second motor to close said first switch when said gang of syringes is fully retracted, means driven by said first motor to close said third switch when said rack is fully advanced, means driven by said second motor to close said second switch when said pistons are fully advanced, and means driven by said first motor to close said fourth switch when said rack is fully retracted.

3. In a machine of the class described, a gang of cylinders, a perforated needle communicating with each cylinder, a piston reciprocable in each cylinder, means providing a valve-controlled inlet to each cylinder, a travelling conveyor arranged to move past said needles, means supporting said cylinders to move toward and away from the path of said conveyor, means for driving said conveyor, step-by-step, past said gang of cylinders, means for reciprocating said gang of cylinders and for reciprocating said pistons relatively to said cylinders, means activated when said cylinders reach their position most remote from said conveyor to actuate said conveyor-driving means to advance said conveyor one step, means activated when said conveyor comes to rest to actuate said reciprocating means to shift said needles substantially into contact with said conveyor and then to advance said pistons in their cylinders to eject fluid from said cylinders through needles, means activated when said pistons are fully advanced to retract said conveyor-driving means without affecting said conveyor, and means activated upon full retraction of said conveyor-driving means to actuate said reciprocating means to retract said pistons and to retract said gang of cylinders.

4. In a machine of the class described, a conveyor, a first fluid motor including a reciprocable piston, a rack driven by said piston, a pinion meshing with said rack, one-way driving means connecting said pinion to drive said conveyor, a block mounted adjacent said conveyor for reciprocation toward and away from said conveyor, a plurality of injectors supported on said block and projecting toward said conveyor in the line of reciprocation of said block to enter an object supported on said conveyor in registry with said block when said block is advanced toward said conveyor, means providing a liquid reservoir in communication with said injectors, a second fluid motor including a piston shiftable between projected and retracted positions, means actuated by said second fluid motor, upon projection of its piston, to advance said block toward said conveyor and subsequently to express liquid from said reservoir through said injectors, a source of fluid under pressure, a first valve means controlling flow between said source and said first motor, a second valve means controlling flow between said source and said second motor, means actuated by retraction of said second fluid motor piston to operate said first valve means to shift said first motor piston to drive said conveyor, means actuated by such shifting of said first motor piston to operate said second valve means to advance said second motor piston, means actuated by advance of said second motor piston to operate said first valve means to return said first motor piston, and means actuated by return of said first motor piston to operate said second valve means to retract said second motor piston.

5. In a machine of the class described, a conveyor, a first motor including a reciprocating element, means including a one-way clutch connecting said element to drive said conveyor step-by-step in one direction, means dominating said motor comprising a projecting electric circuit acting, when energized, to actuate said motor to project said element and a retracting electric circuit acting, when energized, to actuate said motor to retract said element, a first motor projecting switch dominating said projecting circuit, a first motor retracting switch dominating said retracting circuit, a block mounted adjacent the path of said conveyor for reciprocation toward and away from said path, a plurality of injectors supported on said block and projecting toward said conveyor in the line of reciprocation of said block to enter an object supported on said conveyor in registry with said block when said block is advanced toward said conveyor, means providing a liquid reservoir communicating with said injectors, reciprocating means operatively associated with said injectors and movable between a retracted position and a projected position to express liquid from said reservoir through said injectors, a second motor connected to drive said block and said reciprocating means, means dominating said second motor comprising a projecting electric circuit acting, when energized, to actuate said second motor to move said block toward said conveyor and project said reciprocating means and a retracting electric circuit acting, when energized, to actuate said second motor to retract said block and said reciprocating means, a second motor projecting switch dominating said second motor projecting circuit, a second motor retracting switch dominating said second motor retracting circuit, said switches being normally open, means moved by said second motor to close said first motor projecting switch upon retraction of said block, means moved by said first motor to close said second motor projecting switch upon projection of said reciprocating element, means moved by said second motor to close said first motor retracting switch upon projection of said reciprocating means, and means moved by said first motor to close said second motor retracting switch upon retraction of said reciprocating element.

References Cited in the file of this patent

UNITED STATES PATENTS

| | | |
|---|---|---|
| 751,555 | Prescott | Feb. 9, 1904 |
| 1,482,467 | Harrington | Feb. 5, 1924 |
| 2,525,295 | Harrington | Oct. 10, 1950 |
| 2,560,060 | Zwosta | July 10, 1951 |
| 2,587,024 | Avery | Feb. 26, 1952 |
| 2,656,785 | Gannon et al. | Oct. 27, 1952 |